US012664193B2

(12) United States Patent　　　(10) Patent No.:　　US 12,664,193 B2

Semenov　　　(45) Date of Patent:　　Jun. 23, 2026

(54) FUZZY SEARCHING USING WORD SHAPES FOR BIG DATA APPLICATIONS

(71) Applicant: ABBYY Development Inc., Dover, DE (US)

(72) Inventor: Stanislav Semenov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 202 days.

(21) Appl. No.: 17/302,058

(22) Filed: Apr. 22, 2021

(65) Prior Publication Data

US 2022/0335073 A1　　Oct. 20, 2022

(30) Foreign Application Priority Data

Apr. 15, 2021　(RU) .......................... RU2021110604

(51) Int. Cl.
| | |
|---|---|
| *G06F 16/334* | (2025.01) |
| *G06F 16/338* | (2019.01) |
| *G06V 10/20* | (2022.01) |
| *G06V 30/414* | (2022.01) |

(52) U.S. Cl.
CPC ........ *G06F 16/3347* (2019.01); *G06F 16/338* (2019.01); *G06V 10/255* (2022.01); *G06V 30/414* (2022.01)

(58) Field of Classification Search
CPC . G06F 16/3347; G06F 16/338; G06V 10/255; G06V 30/414
See application file for complete search history.

(56) References Cited

U.S. PATENT DOCUMENTS

| | | | |
|---|---|---|---|
| 5,937,084 | A | 8/1999 | Crabtree et al. |
| 7,734,636 | B2 | 6/2010 | Handley |
| 8,879,846 | B2 | 11/2014 | Amtrup et al. |
| 8,898,171 | B2 | 11/2014 | Tan |
| 9,645,993 | B2 | 5/2017 | Zuev et al. |
| 9,727,553 | B2 | 8/2017 | Yakovlev et al. |
| 2007/0260595 | A1 | 11/2007 | Beatty et al. |
| 2010/0333000 | A1 | 12/2010 | Sauls et al. |
| 2016/0019430 | A1 * | 1/2016 | Stella ................... G06K 9/6215 |
| | | | 382/310 |
| 2016/0147736 | A1 | 5/2016 | Danielyan |
| 2021/0209301 | A1 * | 7/2021 | Gupta .................. G06V 10/255 |

FOREIGN PATENT DOCUMENTS

| | | | | |
|---|---|---|---|---|
| RU | 2584457 | C1 | 5/2016 | |
| WO | WO-2021032598 | A1 * | 2/2021 | ........... G06F 16/254 |

* cited by examiner

*Primary Examiner* — Khanh B Pham
*Assistant Examiner* — Ranjit P Doraiswamy
(74) *Attorney, Agent, or Firm* — Lowenstein Sandler LLP

(57) ABSTRACT

Aspects of the disclosure provide for systems and methods for word shape-assisted searches in big data applications. The systems and methods of the disclosure enable operations that identify a mapping scheme in which words are represented via word shapes with same word shapes capable of representing different words. Operations further include forming hypotheses that prospectively associate words in a document with target entries in a database, and eliminainge at least some of the formed hypotheses based on mismatch between sets of word shapes corresponding to the words of the formed hypotheses and word shapes of various database entries.

20 Claims, 9 Drawing Sheets

500

Identify a mapping scheme in which words are represented via word shapes and a same word shape is capable of representing different words 510

Identify a database having a plurality of database entries and respective sets of database word shapes 520

Form a plurality of hypotheses (e.g., 1st, 2nd, etc. hypothesis) prospectively associating sets of words/word shapes of the document with a target entry 530

Eliminate a 2nd hypothesis based on a mismatch between 2nd set of word shapes and each of the plurality of the database sets of word shapes 540

Eliminate a 3rd hypothesis based on a mismatch between a set of intermediate-level word shapes that represent a 3rd set of words of the document and each of intermediate sets of database word shapes 550

Identify a 1st set of words of the document as the target entry by confirming a 1st hypothesis 560

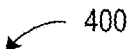
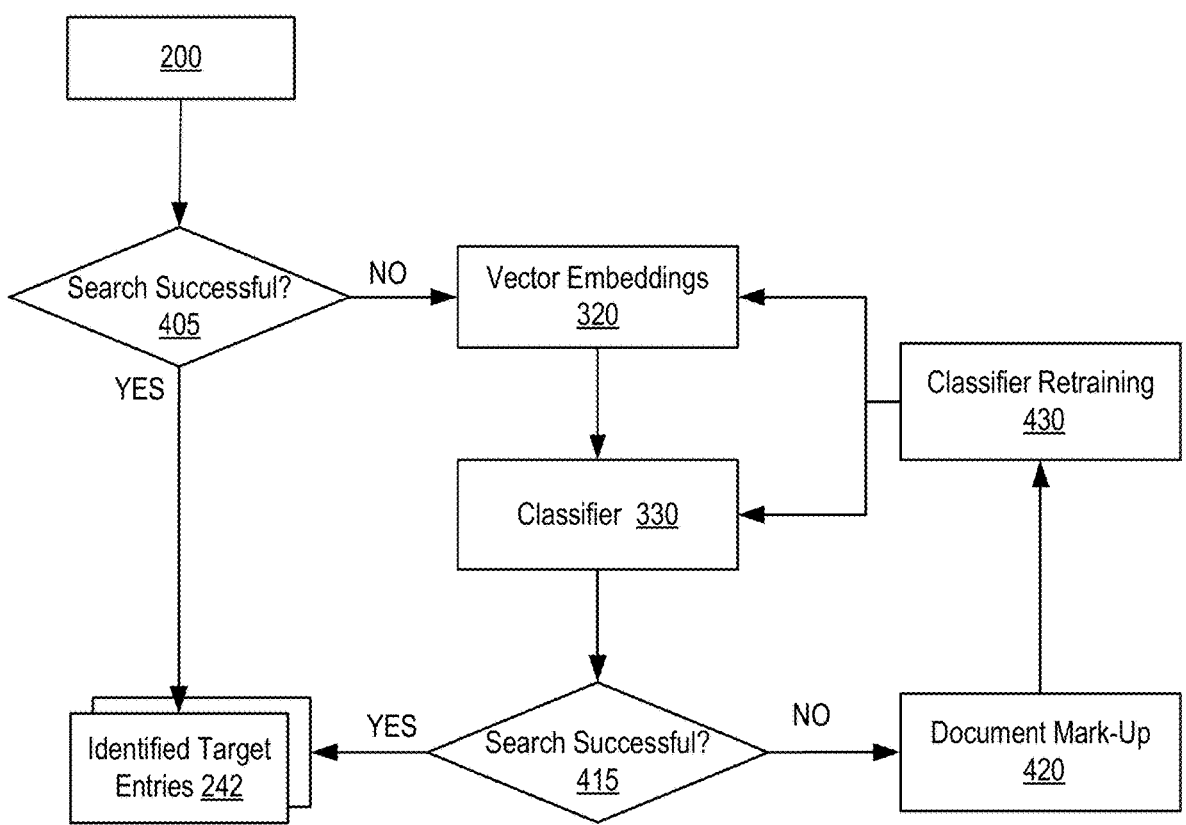
FIG. 4

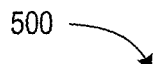
500

Identify a mapping scheme in which words are represented via word shapes and a same word shape is capable of representing different words  510

Identify a database having a plurality of database entries and respective sets of database word shapes  520

Form a plurality of hypotheses (e.g., 1st , 2nd, etc. hypothesis) prospectively associating sets of words/word shapes of the document with a target entry   530

Eliminate a 2nd hypothesis based on a mismatch between 2nd set of word shapes and each of the plurality of the database sets of word shapes  540

Eliminate a 3rd hypothesis based on a mismatch between a set of intermediate-level word shapes that represent a 3rd set of words of the document and each of intermediate sets of database word shapes  550

Identify a 1st set of words of the document as the target entry by confirming a 1st hypothesis  560

FIG. 5

700

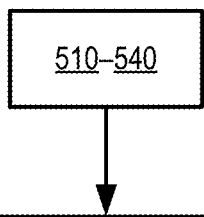

510–540

Determine that each of a sub-plurality of hypotheses is characterized by a sub-threshold mismatch value between word shapes associated with a respective hypothesis and at least one of the database sets of word shapes 710

Obtain word embeddings for the one or more words of each of the sub-plurality of hypotheses 720

Process the obtained word embeddings with a trained classifier to identify the first set of words of the document as the target entry 730

FIG. 7

FUZZY SEARCHING USING WORD SHAPES FOR BIG DATA APPLICATIONS

RELATED APPLICATIONS

This application claims priority under 35 USC 119 to Russian patent application No. RU2021110604, filed Apr. 15, 2021, the disclosure of which is incorporated by reference herein.

TECHNICAL FIELD

The implementations of the disclosure relate generally to computer systems and, more specifically, to systems and methods for efficient identification of database entries in documents using word shape-assisted searching algorithms for big data applications.

BACKGROUND

Detecting various fields and values (data entries) of such fields in various documents, including unstructured digital documents is an important task in processing, storing, and referencing information. Conventional approaches for field detection may involve the use of a large number of manually configurable heuristics, word-to-word comparisons, human-assisted searching, and various other operations that are inefficient or computationally expensive.

SUMMARY OF THE DISCLOSURE

Implementations of the present disclosure describe mechanisms for efficient identification of database entries in documents. A method of the disclosure includes identifying a mapping scheme in which words are represented via word shapes and a same word shape is capable of representing different words, identifying a database comprising a plurality of database entries, and a plurality of database sets of word shapes, each of the database sets of word shapes representing one or more words of a respective database entry, forming a plurality of hypotheses comprising a first hypothesis prospectively associating with the target entry (i) a first set of words of the document and (ii) a respective first set of word shapes, and a second hypothesis prospectively associating with the target entry (i) a second set of words of the document and (ii) a respective second set of word shapes; eliminating the second hypothesis based on a mismatch between the second set of word shapes and each of the plurality of the database sets of word shapes, and identifying the first set of words of the document as the target entry by confirming the first hypothesis.

A non-transitory machine-readable storage medium of the disclosure includes instructions that, when accessed by a processing device, cause the processing device to identify a mapping scheme in which words of a document are represented via word shapes and a same word shape is capable of representing different words, identify a database comprising a plurality of database entries, and a plurality of database sets of word shapes, each of the database sets of word shapes representing one or more words of a respective database entry, form a plurality of hypotheses comprising a first hypothesis prospectively associating with a target entry in the document (i) a first set of words of the document and (ii) a respective first set of word shapes, and a second hypothesis prospectively associating with the target entry (i) a second set of words of the document and (ii) a respective second set of word shapes, eliminate the second hypothesis based on a mismatch between the second set of word shapes and each of the plurality of the database sets of word shapes, and identify the first set of words of the document as the target entry by confirming the first hypothesis.

A system of the disclosure includes a memory and a processing device operatively coupled to the memory, the processing device to identify a mapping scheme in which words of a document are represented via word shapes and a same word shape is capable of representing different words, identify a database comprising a plurality of database entries, and a plurality of database sets of word shapes, each of the database sets of word shapes representing one or more words of a respective database entry, form a plurality of hypotheses comprising, a first hypothesis prospectively associating with a target entry in a document (i) a first set of words of the document and (ii) a respective first set of word shapes, and a second hypothesis prospectively associating with the target entry (i) a second set of words of the document and (ii) a respective second set of word shapes, eliminate the second hypothesis based on a mismatch between the second set of word shapes and each of the plurality of the database sets of word shapes, and identify the first set of words of the document as the target entry by confirming the first hypothesis.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 4 is another schematic diagram illustrating example operations of a word shape-assisted search that involves retraining the classifier, in accordance with some implementations of the present disclosure.

FIG. 5 is a flow diagram illustrating one example method of identifying a target entry in a document using word shape-assisted searching, in accordance with some implementations of the present disclosure.

FIG. 7 is a flow diagram illustrating one example method that deploys a trained classifier in word shape-assisted searches of documents, in accordance with some implementations of the present disclosure.

DETAILED DESCRIPTION

Figure 1:
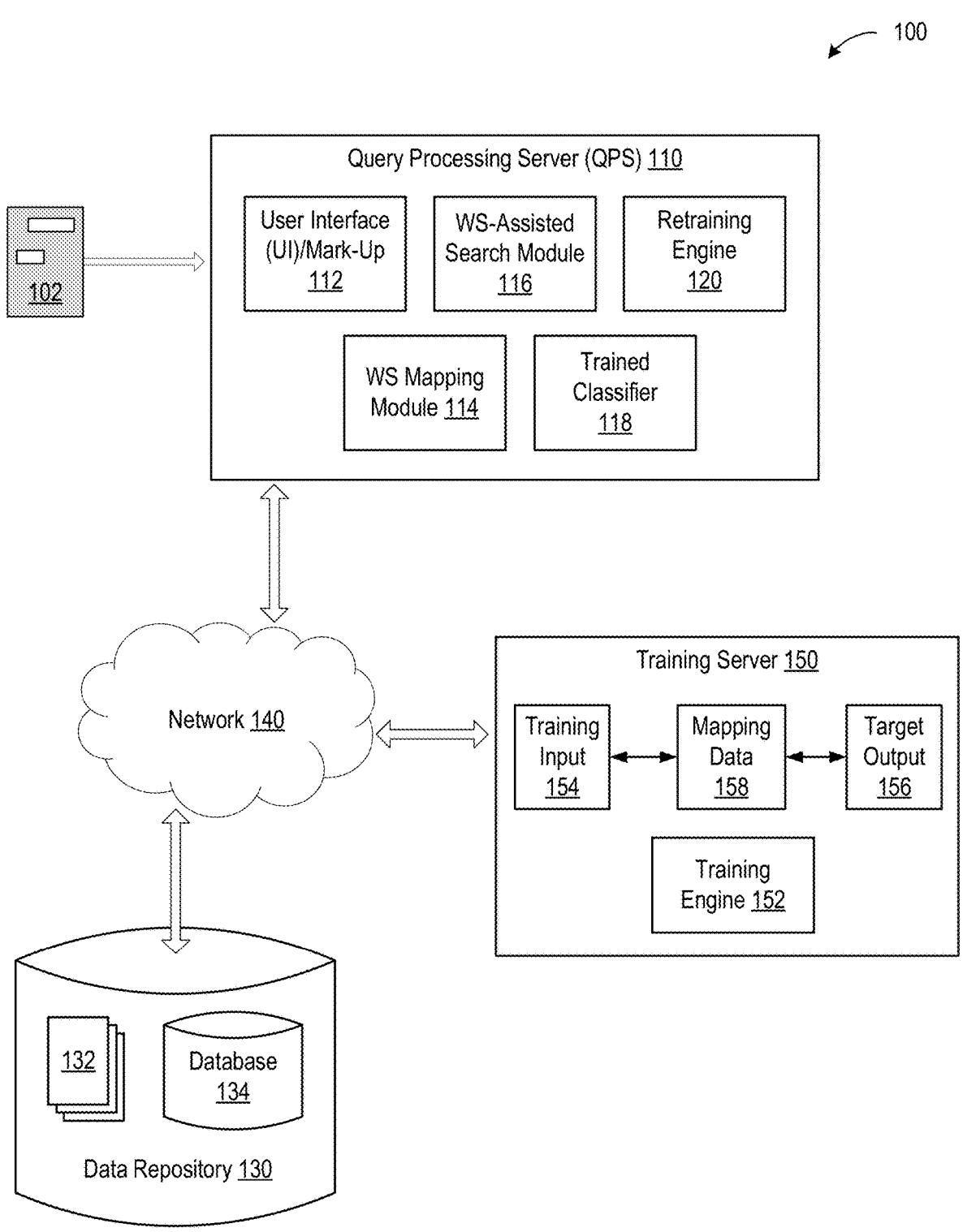
FIG. 1 is a block diagram of an example computer system in which implementations of the disclosure may operate.

Implementations for detecting fields and values of such fields in digital documents using word shape-assisted searching are described. A document (e.g., invoice) may include a number of fields—buyer's name and address, buyer's bank account information, listings or goods purchased, shipping destination, estimated delivery date, and so on. Some of the fields may be populated with information, which represents the value of the corresponding fields. Some of the values may be stored in a database, e.g., being entered during previous transactions with the buyer or available from other sources, such as government and commercial directories. For example, buyer's name, address, and financial information may be stored in the database. The database may have been collected over a number of years and may include a large number of entries, each entry corresponding to a specific piece of information about a particular vendor, client, customer, provider, partner, shipping agent, etc. Even though the database may be structured (e.g., catalogued) over various categories of entries, identifying fields (and corresponding values) in a document based on a comparison with the entries in the database may still be problematic because the fields in the documents may be unidentified. For example, the document may unstructured, written in a non-standard way, may be printed on a new form, in which the fields are located at unexpected places, and so on. One conventional approach to identifying fields and values is based on forming multiple hypotheses and checking those hypotheses against various database entries. For example, to identify an address of a vendor that is typed or written somewhere in the document, various hypotheses may be composed, e.g., consecutive 4, 5, etc., words, words located across 2, 3, etc. lines, and so on. In a document with hundreds of words, tens of thousands (or more) of hypotheses may be formed. Each of those hypotheses may then be checked against various database entries, which may be a daunting task for large databases, which may include tens of millions (or more) entries.

Aspects and implementations of the present disclosure address the above noted and other problems of big data handling technology by providing efficient mechanisms for forming and verifying hypotheses to identify fields and corresponding values of the identified fields in searchable but unstructured documents. In some implementations, for increased speed and efficiency, searches may involve word shapes that carry a reduced information compared with actual words. For example, a word may be mapped on a word shape, which may retain some information about the structure of the word but not about the exact actual characters of the word. For example, words "Street" and "Account" may be mapped onto respective word shapes "Xxxxxx" and "Xxxxxxx," which still contain information about the length of the words, but not about specific letters. A search performed according to some implementations of the present disclosure may begin with comparing (as part of hypotheses verification) word shapes corresponding to words in the document to word shapes corresponding to words of database entries. As a result, a mismatch between words "Street" and "Account" may be detected already at the word shape level and a large number of hypotheses may be quickly invalidated based on word shapes rather than actual words.

Because word shapes contain a reduced amount of information about the words that word shapes represent, a given word shape can map multiple different words, e.g., Xxxxxxx may be a word shape not only for Account but also for Banking, Routing, License, and various other words. Accordingly, after multiple initial hypotheses are eliminated based on mismatch of word shapes, the remaining hypotheses may then be verified based on the actual words. In this example, for simplicity of illustration, one level of word shapes is used. In some implementations, a hierarchical tree of word shapes may be deployed. For example, word shapes Xxxxxx and Xxxxxxx may be intermediate-level word shapes for the words Street and Account while even a more simplified word shape Xx may be used for both words at the next (second) word shape level (in which a sequence of lower-case characters is mapped onto a single character "x"). Although the words Street and Account have the same second-level word shape Xx and, therefore, cannot be distinguished at the second word shape level, the two words can still be distinguished from all-lower-case words "license" or "number" (word shape "x") or from punctuated words, such as "non-negotiable" (word shape "x-x"), or the like. With a mapping scheme that includes multiple word shape levels, formed hypotheses may be verified using a hierarchical procedure that is performed in the direction opposite to formation of word shapes. First, hypotheses than have a mismatch at the highest word shape level may be eliminated. Next, the remaining hypotheses may be verified/eliminated at the next highest word shape level, and so on. Lastly, the still remaining hypotheses may be verified at the actual word level, at which point only a small fraction off hypotheses may remain.

In some implementations, full matching of any of the remaining hypotheses does not occur. For example, some part of a field value may be absent (e.g., a drafter/writer may have forgotten to type or may have omitted/shortened some words), a field value may be partially unreadable (e.g., a creased, damaged, or partially illegible document), and so on. In such instances, the implementations disclosed herein allow a processing device performing the search to deploy a trained classifier. The classifier may be trained specific for specific documents of a given type (e.g., invoices). The classifier may be capable of identifying, based on a partial matching of the available words, a correct (target) database entry. In some implementations, more than one database entry may be identified together with corresponding confidence levels, and a user may perform a final selection.

As used herein, "unstructured document" (also referred to simply as "document" herein) may refer to any document whose image or any other digital representation may be accessible to a computing system that performs identification of data. The image may be a scanned image, a photographed image, or any other representation of a document that is capable of being converted into a form accessible to a computer. For example, "unstructured document" may refer to a file that includes one or more digital content items that may be rendered to provide a visual representation of the document (e.g., on a display or in a printed form). In accordance with various implementations of the present disclosure, a document may conform to any suitable electronic file format, such as PDF, DOC, ODT, JPEG, etc. Although the document may be represented in an electronic (e.g., digital) file format, it is not necessary that the document be electronically structured and that the document layout—locations of various text fields, tables, paragraphs, etc.—be specified in the electronic file. (That, for example, would be the case if the document were originally issued in an electronic format—an e-invoice or other similar electronic documents—with the locations of the fields and tables already specified.)

"Document" may represent a financial document, a legal document, or any other document, e.g., a document that is produced by populating fields with any alphanumeric symbols (e.g., letters, words, numerals) or images. "Document" may be printed, typed, or handwritten (for example, by filling out a standard form). "Document" may represent a form that has a variety of fields, which may be indicated with boxes, underlining, shading, table cells, rows, columns, graphical elements, or may be lacking any particular indication. For example, a document may have a driver's license or a Vehicle Identification Number typed as part of a text of a letter. As used herein, "field" may refer to any part of a document that is defined by a purpose and/or a structure of the document, e.g., a passport application form may include fields "First Name," "Last Name," "Date of Birth," or any other fields that an applicant has to fill with alphanumerical data (words and numerals). Likewise, some documents may have a standard content (e.g., be mandated by regulations or established business practices) but flexible vendor-specific distribution of such content within the document—mortgage/credit applications, real-estate purchase contracts, loan estimates, insurance contracts, police reports, purchasing orders, invoices, and so on. Additionally, "field" may also refer to any unit of information (address, quantity of goods sold, credit card expiration date, etc.) that is provided in a free-form document, such as a business letter, a memorandum, etc. Actual instance of data within a specific field is referred herein as the value of the field. For example, "432 5$^{th}$ Street, Bloomingdale, West Virginia, USA" is an example of a value of the field "Address." Documents may have fields that are encountered once or repeated multiple times within the same form (such as document number, date, total amount tendered, etc.) or fields that may have multiple values (such as multiple order numbers, dates, shipping addresses, types of merchandize to be shipped, etc.).

In some implementations, the techniques described herein allow automatic detection of fields and entries in documents using artificial intelligence, such as neural networks or other machine learning systems. Neural network may include multiple neurons that are associated with learnable weights and biases. The neurons may be arranged in layers. The neural network may be trained on a training dataset of documents that contain known fields and entries. A training document may be (e.g., by a client or a developer), for example by identifying an entry in the document (e.g. "card expiration date Sep. 12, 2022") that is present in a database.

FIG. 1 is a block diagram of an example computer system 100 in which implementations of the disclosure may operate. As illustrated, system 100 may include a query processing server (QPS) 110, a data repository 130, and a training server 150 connected to a network 140. Network 140 may be a public network (e.g., the Internet), a private network (e.g., a local area network (LAN) or wide area network (WAN)), or any combination thereof.

The computer system 100 may be a desktop computer, a laptop computer, a smartphone, a tablet computer, a server, a scanner, or any suitable computing device capable of performing the techniques described herein. In some implementations, QPS 110 may include one or more processing devices 802 of FIG. 8.

A document 102 may be received by QPS 110. Document 102 may include any suitable text, image, may belong to any suitable type, such as a commercial or governmental application, a contract, a research paper, a memorandum, a medical document, a government-issued identification, a newspaper article, a business card, a letter, or any other type of a document. In some implementations, a type of document 102 may be specified by a user (e.g., a user accessing QPS 110, locally or remotely). In some implementations, a type of document 102 may be unknown. In some implementations, document 102 may be received as part of a set (stack) of multiple documents. Document 102 may be received in any suitable manner. For example, QPS 110 may receive a digital copy of document 102 after scanning or photographing the document. In some instances, a user may upload document 102 to QPS 110 e.g., via network 140, from the user's local computer, from a remote computer accessible to the user, from a cloud storage service, and the like. In some implementations, text in document 102 may be recognized using any suitable optical character recognition (OCR) techniques.

In some implementation, QPS 110 may include a user interface (UI) 112. UI 112 may allow a user to select document 102, upload document 102, perform OCR on document 102, store document 102 and/or or the OCR result, retrieve document from storage, select a type of a field (e.g., "name," "address," "shipping destination," etc.) for a search query, initiate search query, view and save results of the search query, and so on. UI 112 may be a graphics UI, a command-line UI, a menu-based UI, a voice-activated UI, or any other suitable UI or a combination of multiple types of UIs. UI may be displayed on a screen of a desktop computer, a laptop computer, a tablet, a smartphone, a client device of a remote server, a touch-screen, etc., or any combination thereof. User inputs may be entered via a pointing device (mouse, stylus, finger, etc.), a keyboard, a touchpad, a touchscreen, a microphone, an eye-movement monitoring device, an augmented reality device, etc., or any combination thereof.

QPS 110 may include a word shape mapping (WS) module 114. Token mapping module 114 may be configured to implement one or more mapping schemes that map words on word shapes, as discussed in more detail below, in conjunction with FIGS. 2B and 2C. Token mapping module 114 may transform at least some of words of document 102 into corresponding word shapes. In some implementations, a mapping scheme may involve multiple levels of word shapes, each level including word shape of more compact form than the preceding level. QPS 110 may further include a word shape-assisted search module 116 to perform search query using word shapes of words of document 102 and word shapes of words of database entries, as described in more detail below in conjunction with FIGS. 2A-2C. The word shape-assisted search module 116 may form multiple hypotheses about prospective correspondence of one or more words of document 102 with various entries of the database. The word shape-assisted search module 116 may use word shapes to eliminate some (or most) of the formed hypotheses before verifying the remaining hypotheses using the actual words in those hypotheses.

In some instances, where an exact match is possible (or a match within a certain tolerance), word shape-assisted search module 116 may be capable to perform the search and identify correct results of the search query. In some instances, where an exact match does not occur or is unlikely, QPS 110 may deploy a trained classifier 118 to select from a number of incomplete matches. Classifier 118 may be initially trained on the side of a provider (developer) and further trained (re-trained) by a retraining engine 120 on the side of a client (user). For example, a mark-up functionality of UI 112 may allow the user to select fields in documents selected as training documents to train classifier 118 to identify fields based on incomplete matching, as described in more detail below. During a mark-up, the user may identify fields of interest to the user (e.g., based on the user's commercial or professional interests) and mark such fields using bounding boxes, pointers, highlighting, shading, and the like. The user may also identify a type of a marked field. Classifier 118 may be trained differently (e.g., separately) for different types of documents and may include multiple types of machine learning models (e.g., decision tree classifiers and/or neural network models), such as vendor name model, a shipping address model, a banking information model, etc., each model specializing in determining one or more type of fields. Different models of classifier 118 may have different architectures (e.g., different numbers of neuron layers and different topologies of neural connections) and, by virtue of separate training, different parameters (weights, biases, activation functions, etc.) of the respective neural networks.

Computer system 100 may include a data repository 130 storing multiple documents having fields of interest and a database 134 of values of such fields. Database 134 may be indexed by a type of field, e.g., vendor address, vendor name, phone number, bank account number, date of incorporation, volume of sales, inventory, and so on. Database 134 may further be indexed by values of the fields, e.g., names can be listed in an alphabetical order, driver's license numbers can be listed in the order of issuance, in the order of digits, by the name of the holder, by a number and type of traffic violations committed, and so on. Database 134 may include numerous entries that may be collected from documents 132 or obtained from any other appropriate sources, e.g., downloaded from other databases, collected from surveys, phone books, public and government records, and so on. After information from documents 132 is transferred (and, optionally, indexed) into the database 134, some of documents 132 may be discarded while some of the documents may be retained for training of classifier 118 as described below.

Computer system 100 may include training server 150 for initial training of classifier 118. Training server 150 may include a training engine 152. Training engine 152 may construct classifier 118 for identification of fields in documents. Classifier 118, as illustrated in FIG. 1, may be trained by the training engine 152 using training data that includes training inputs 154 and corresponding target outputs 156 (correct matches for the respective training inputs). During training of classifier 118, training engine 152 may find patterns in the training data that map each training input 154 to the target output 156.

For example, the training engine 152 may select (e.g., randomly) a number of documents 132 as training documents. Training documents may be stored in data repository 130. Training documents may be marked up, with fields of interest identified. In some implementations, the markup may be performed by a human operator before the marked-up document is placed into data repository 130. The training data may be stored in the repository 130 and may include one or more training inputs 154 and one or more target outputs 156. Training data may also include mapping data 158 that maps training inputs 154 to the training outputs 156. In some implementations, mapping data 158 may include identification of at least some of the fields in the training inputs 154 and corresponding values of the identified fields. For example, a training document may be used as a training input 154 and may include a field "Driver's License Number." The value of that field, e.g., "123-456-7890" may represent the target output 156. The mapping data 158 may include an identifier of the training document, location (e.g., coordinates of a bounding box, line and/or column numbers, etc.) of the field "Driver's License Number" within the training document, an identifier of the target output 156, and the like. In some training documents, some of the values of the fields may be smudged and not fully readable.

During training of classifier 118, training engine 152 may change parameters (e.g., weights and biases) until classifier 118 successfully learns how to correctly identify the value of the marked field. Additional training documents can then be used, e.g., with the fields located at different part of the document, typed in a different font or handwritten in a different script, and so on. Trained classifier 118 may subsequently be used for making identifications (inferences) of fields/values in new documents. Different models may be trained for different types of the fields. Some of the types of the models may be pre-trained using training engine 152. Additional types of the models may be trained on the client side using retraining engine 120 for specific fields that may be of interest to a particular user, and based on user-provided training documents.

Each of the models trained as part of the classifier 118 may include decision-tree algorithms, support vector machines (SVM), deep neural networks, and the like. Deep neural networks may include convolutional neural networks, recurrent neural networks (RNN) with one or more hidden layers, fully connected neural networks, long short term memory neural networks, Boltzmann machines, and so on.

The data repository 130 may be a persistent storage capable of storing documents as well as data structures configured to perform automatic character recognition in accordance with implementations of the present disclosure. The data repository 130 may be hosted by one or more storage devices, such as main memory, magnetic or optical storage based disks, tapes or hard drives, NAS, SAN, and so forth. Although depicted as separate from QPS 110, in an implementation, the data repository 130 may be part of QPS 110. In some implementations, data repository 130 may be a network-attached file server, while in other implementations data repository 130 may be some other type of persistent storage such as an object-oriented database, a relational database, and so forth, that may be hosted by a server machine or one or more different machines accessible to the QPS 110 via the network 140.

Figure 2A:
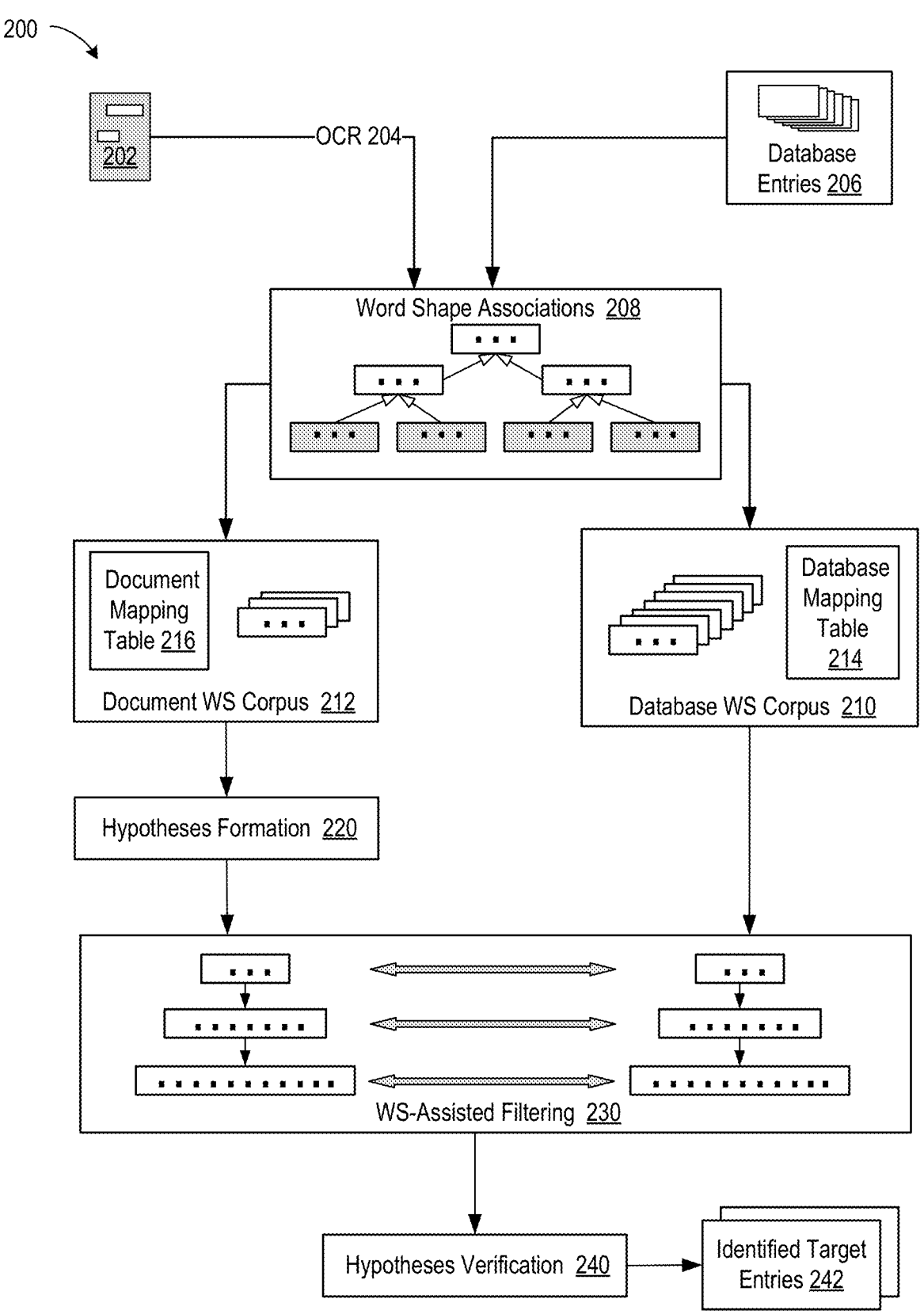
FIG. 2A is a schematic diagram illustrating example operations of a query processing engine performing a word shape-assisted search for one or more target entries, in accordance with some implementations of the present disclosure.

FIG. 2A is a schematic diagram illustrating example operations 200 of a query processing engine (e.g., QPS 110 of FIG. 1) performing a word shape-assisted search for one or more target entries, in accordance with some implementations of the present disclosure. An input into a search query may include a document 202, which may be of any type discussed above or any other suitable type of a document. Document 202 may be a previously stored (e.g., on user's computer, cloud, etc.) document or a newly created or received document. Document 202 may undergo optical character recognition (OCR) 204 to obtain an OCR text of the document and, in some implementations, to partition the OCR text into a plurality of symbols representing various words, numbers, sentences, pictures, etc., of the document. In some implementations, multiple documents 202 (e.g., a stack of documents) may be received by the QPS. The input into a search query may further include one or more types of fields whose values are to be located within document 202

(or a stack of documents). For example, the search query may specify that all vehicle registration information and driver's license numbers are to be identified in document 202. In another example, banking information is to be identified in document 202, e.g., customer bank account numbers, routing numbers, SWIFT, BIC numbers, and the like. The type of information to be identified may be specified by the user, by the software deployed by the user, or may be a default type of information for a type of document 202 input into the search query. The type of document 202 and/or the type of information to be identified in document 202 may cause the QPS performing the search to identify a database having database entries 206 that are relevant for the search. For example, in conjunction with receiving a search query for a vendor's address, the QPS may identify that the search query is to be performed within a vendor information database (e.g., a part of database 134 of FIG. 1) and that the search is to be restricted to addresses (rather than financial or product information) in that database. In some implementations, the search may be unrestricted, e.g., to be performed for all database entries 206 that are available in database 134. Any given database entry 206 may include one or more words, numbers, phrases, sentences, paragraphs, formulas, equations, logos, or any other entities.

Having identified the relevant database entries 206, the QPS may perform (or access previously performed) word-word shape associations, also referred herein for brevity as word shape associations 208, obtained using any suitable mapping schemes (e.g., by word shape mapping module 114 of FIG. 1). Word-word shape associations 208 may map words (depicted schematically with shaded boxes) to one or more hierarchical levels of word shapes (white boxes). A word may be any collection of one or more alphanumerical characters, including letters, symbols, glyphs, numerals, punctuation marks, spaces, and the like, that is used (or capable of being used) in any human-perceptible or machine-readable form of information transfer. For example, a word "account" is perceptible by a human and carries with it a certain information content (even though its precise meaning may depend on a particular context in which the word is used). Similarly an ASCII encoding (or any other machine encoding) of the word "account" may be readable by a computer. A word shape may likewise be any collection of alphanumerical characters that represents a word, possibly in a non-invertible way. In other words, whereas the mapping Word→Token is single-valued (so that a particular word is mapped onto a unique word shape), the inverse mapping Token→Word may be multi-valued (as more than one word shape may be capable of representing multiple words). For example, in a mapping scheme where all consonant letters are represented with character "x" and all vowel letters are represented with character "y," the word "Total" may be mapped on the word shape "Xyxyx," and the word "Debit" may be mapped on the same word shape. The inverse mapping may be non-unique, as "Xyxyx" may be a word shape of either "Total" or "Debit" (or numerous other words, e.g., "Milan"). Not all word shape associations have to be non-invertible. A particular word may be sufficiently unique (e.g., a word that is long and contains an uncommon sequence of letters) so that a respective word shape association may be invertible. Accordingly, it should be understood that the non-invertibility of word shape-to-word transformations pertains to the total corpus (a vocabulary) of words (e.g., words of the database) and the total corpus of respective word shapes, but should not be understood as a necessary condition for each individual word shape association. As a result, a database word shape corpus 210 may have fewer different word shapes (significantly fewer, for some mapping schemes) than there are fewer different words in database entries 206.

As depicted schematically within a box depicting word shape associations 208, more than one level of word shapes may be used in forming word shape associations. For example, a second word shape level may omit the distinction between consonant and vowel letters, may represent all consecutive characters of the same type via a single character of the same type, and so on. It should be recognized that a practically unlimited number of different word shape mapping schemes may be devised in which each new level of word shapes maps multiple previous-level word shapes on a given word shape of the new level.

By way of construction, a word shape corpus has a reduced information content compared with the word corpus. As a result, a sentence, a phrase, or any other set of words may be not have a perceptible meaning to a human or a machine after the words are replaced with (mapped onto) the respective word shapes. Nonetheless, the resulting set of word shapes is still carrying an important information about a structure of the words and may be used to eliminate various unlikely associations (hypotheses) at a level which has much fewer units (word shapes) than the word corpus (and, as a result, considerably speed up the search).

Word-to-word shape association may similarly be performed for a word corpus of document 202 to obtain a document word shape corpus 212. In some implementations, document word shape corpus 212 may be obtained by word shape mapping module 114 of FIG. 1 after OCR 204 is performed. In some implementations, the database word shape corpus 210 may be pre-computed and stored, e.g., in the same data repository 130, so that only a new document 202 is processed for its word shapes.

Because the database word shape corpus 210 may have fewer different word shapes than there are different words among database entries 206 (and similarly, the document word shape corpus 212 may have fewer word shapes than there are words in document 202), a database mapping table 214 and a document mapping table 216 may be used to enable conversion of word shapes back to words. For example, the database mapping table 214 may specify, for each word shape in the database word shape corpus 210, where among the database entries 206 the word(s) mapping on the respective word shapes are located. Likewise, the document mapping table 216 may specify, for each word shape in the document word shape corpus 212, where in the document 202 the corresponding word(s) are located. Locations may be identified via coordinates of the words, coordinates of the bounding boxes, via line/character counts, or in any other suitable way.

In some implementations, the QPS may perform the search for the target entries of database within document 202 as follows. Based on the type of the target entry (e.g., address, driver's license number, etc.), the QPS may determine that a likely set of words in document 202 that corresponds to a target database entry has N words. For example, an address may have N=5 words (building number, street, city, postal/zip code, state/country), but may have fewer (e.g., N−1) words, if some words are missing, or more words (e.g., N+1, N+2, etc.), if a street or a city include more than one word). A customer account number many have N=3 words, e.g., "account number 987654," but may have N−1 words if the word "account" is omitted or N+1 words if the word "customer" is included. Based on the likely number of words (including tolerance for larger and/or smaller numbers), the QPS may perform hypotheses formation 220 using various possible combinations of words in document 202. For example, if the likely number of words in a target entry is N and there are M words in document 202, the QPS may form M+1−N hypotheses that N consecutive words belong to the target entry. Additionally, the QPS may form a number of hypotheses in which N words are split across two or more adjacent rows while being in vertical proximity to each other. Additional hypotheses may be formed across non-adjacent rows to account for situations in which some of the rows have underlining, instructions typed under the rows, and the like. More hypotheses may be formed to account for situations where words of the target entry may be interspersed with instruction words that are in line with the words of the target entry. Numerous other situations may be envisioned depending on a likely layout of the document. Yet more hypotheses may be added if it is possible that the words of the target entry may have some permutations in the order in which these words may be found in the document (e.g., "First Name, Last Name" vs. "Last Name, First Name").

In conventional searches, a large number of formed hypotheses H would have to be compared to a large number of database entries D making a total of H*D various possible combinations. In a document with thousands of words, tens of thousands (or more) hypotheses may be formed that may need to be compared to millions of database entries. As a result, a number of possible combinations may be billions. To perform a fast elimination of many of the formed hypotheses, the QPS may use word shape-assisted filtering 230 using word shapes in a reverse-hierarchical order compared with the order in which word shape-assisted associations 208 were formed. More specifically, for each of the formed hypotheses, words are replaced with respective word shapes (e.g., using the document mapping table 216) and then compared with word shapes of database entries. A mismatch between the highest level word shapes (the top row in a box depicting word shape-assisted filtering 230) of hypotheses and the highest level of word shapes of the database entries may be used to eliminate a first set of hypotheses. Such hypotheses have the largest differences with the target entries, sufficiently large to survive multiple levels of word shapes down to the most basic word characteristics. Eliminated may be those hypotheses that have a mismatch that is greater than a threshold mismatch (as described in more detail below) with all relevant database entries. Additionally, eliminated may be those database entries that have a mismatch that is greater than the first threshold mismatch with all formed hypotheses. Consequently, the number of the hypotheses, as well as the number of (prospectively relevant) database entries may be substantially reduced. Because the database word shape corpus 210 (and the document word shape corpus 212) at the highest level of word shapes may contain significantly fewer entities than the database word corpus (and the document word corpus), the highest level word shape-assisted filtering can be performed much faster than a full word-based search.

Of the remaining hypotheses, a second set may be similarly eliminated based on a mismatch of those hypotheses that are characterized by a mismatch between the second highest level of word shapes of hypotheses and the second highest level of word shapes of the database entries. Again, eliminated may be those hypotheses that have a mismatch that is greater than a second threshold mismatch with all still remaining database entries. In some implementations, the second threshold mismatch may be the same or different than the first threshold mismatch used for the highest word shape level elimination. Additionally, eliminated may be (still remaining) database entries that have a mismatch that is greater than the threshold mismatch with still remaining hypotheses.

The process of word shape-assisted filtering 230 may be continued until all levels of word shapes have been used for hypotheses elimination. The remaining hypotheses may then undergo hypotheses verification 240. During verification, the word shapes of the words of the remaining hypotheses and the word shapes of the remaining database entries may be replaced back with the actual words (e.g., using the database mapping table 214 and the document mapping table 216) and a much smaller number of comparisons may be performed to identify target entries 242.

Figures 2B, 2C:
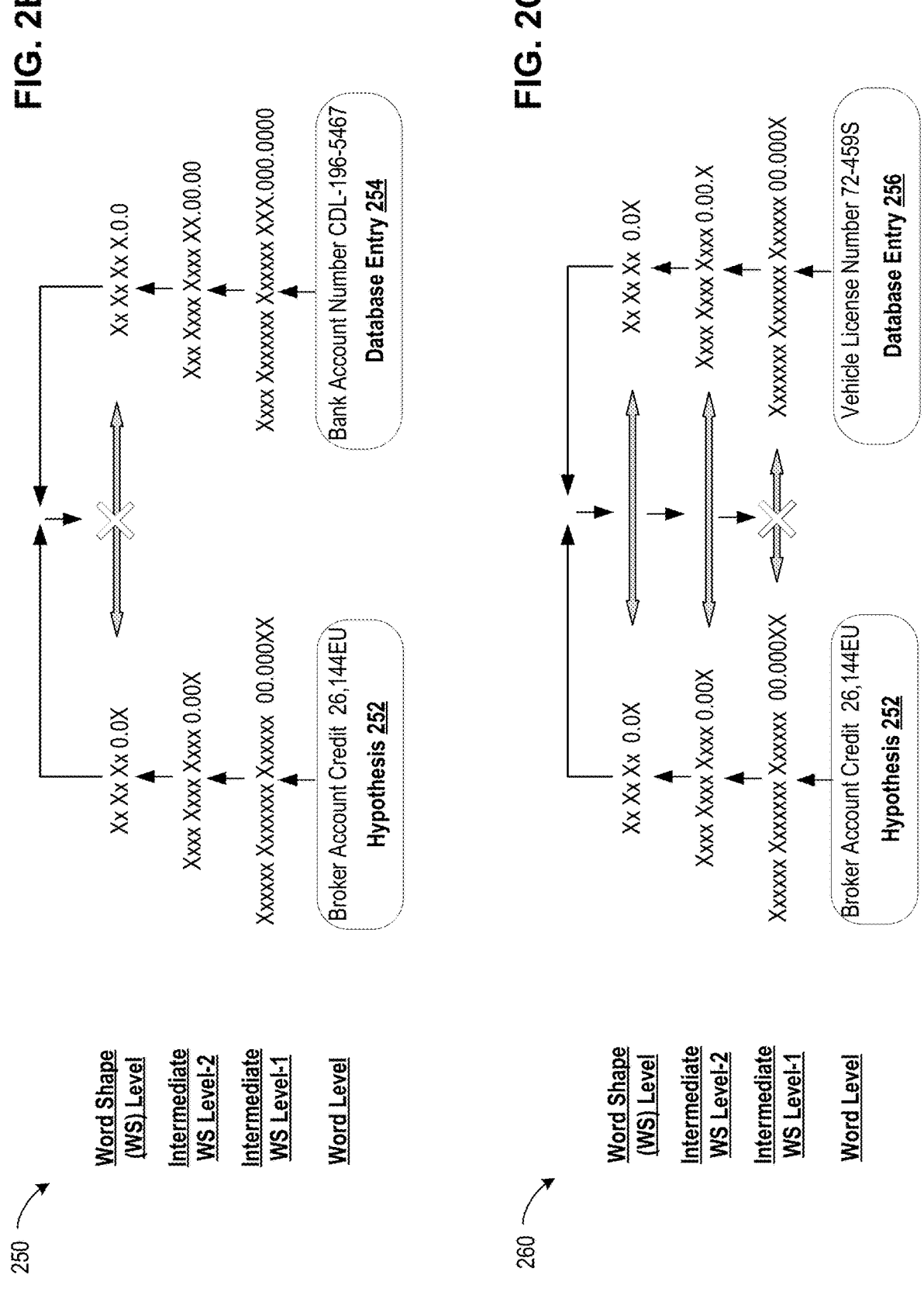
FIG. 2B is a schematic diagram illustrating a word shape-assisted filtering of hypotheses performed by the query processing engine, in accordance with some implementations of the present disclosure.
FIG. 2C is a schematic diagram illustrating another instance of a word shape-assisted filtering of hypotheses performed by the query processing engine, in accordance with some implementations of the present disclosure.

FIG. 2B is a schematic diagram 250 illustrating a word shape-assisted filtering of hypotheses performed by the query processing engine, in accordance with some implementations of the present disclosure. Shown is a hypothesis 252 formed by the QPS in the course of executing a search query for some type of a target entry. Based on the type of the target entry, the QPS may have formed one or more 4-word phrases (hypotheses). Hypothesis 252 has four words "Broker Account Credit 26,144EU." The SPS may also select various 4-word database entries. Shown is a database entry 254 "Bank Account Number CDL-196-5467." Instead of identifying a mismatch between hypothesis 252 and database entry 254 using word-to-word comparison, the QPS may identify the mismatch using word shapes of the respective phrases. Illustrated is a non-limiting example word-word shape mapping scheme that has two intermediate word shape levels (level-1 and level-2) and the ultimate word shape level (top row in diagram 250). As shown by the ascending arrows, hypothesis 252 and database entry 254 are each represented via respective word shapes (e.g., by word shape-mapping module 114) using increasingly (with each subsequent word shape level) more compact word shapes.

In the example scheme shown, intermediate level-1 word shapes are obtained from words by replacing each letter with character "x" ("X" in case of a capital letter), each numeral with "0" and each punctuation mark with a period "." Intermediate level-2 word shapes are obtained from intermediate level-1 word shapes by combining each pair of repeated symbols ("x," "0," or ".") with a single symbol of the same type. For example, four repeated symbols "xxxx" are mapped onto two symbols "xx." In the instances of an odd number of repeated symbols, an unpaired symbol is counted as a full pari, e.g., a sequence "00000" is mapped onto "000." The ultimate word shapes are obtained from intermediate level-2 word shapes by combining all repeated symbols of a particular type into a single symbol of the same type (with "x" and "X" treated as different symbols). As a result, hypothesis 252 is mapped on a word shape "Xx Xx Xx 0.0X" and database entry 254 on a word shape "Xx Xx Xx 0.0" that are different from each other.

The QPS (e.g., deploying word shape assisted search module 116) may begin at the highest word shape level and detect a mismatch between the first word shape and the second word shape, as depicted schematically by a white cross in FIG. 2B. Based on the detected mismatch, the QPS may eliminate a prospective correspondence between hypothesis 252 and database entry 254.

FIG. 2C is a schematic diagram 260 illustrating another instance of a word shape-assisted filtering of hypotheses performed by the query processing engine, in accordance with some implementations of the present disclosure. Shown is the same hypothesis 252 and a different database entry 256

"Vehicle License Number 72-459S" that is represented using the same mapping scheme. Similarly to the example of FIG. 2B, the QPS may begin at the highest word shape level and determine that both hypothesis 252 and database entry 256 have the same word shape "Xx Xx Xx 0.0" and, responsive to such determination, continue to the lower word shape levels (as depicted by the descending arrows). The QPS may then determine that no mismatch occurs between the respective level-2 word shapes, and may finally detect a mismatch between the respective level-1 word shapes. In particular, the mismatch may be identified based on a different number of symbols "x" in the first word and a different number of symbols "X" in the last word.

If a hypothesis results in a mismatch with every database entry at least at one word shape level, the hypothesis may be eliminated and no comparison of actual words (e.g., "Broker Account Credit 26,144EU" vs. "Vehicle License Number 72-459S") need to be performed. Similarly, if a database entry results in a mismatch with all formed hypotheses, the database entry may be eliminated from further consideration.

Each level of word shapes may have a pre-determined mismatch tolerance. Having a certain degree of tolerance is beneficial since some mismatches can be clerical rather than substantive. For example, the creator of a document can mistype one or more characters, the OCR processing can misrecognize one or more characters, the document or its image can be partially unreadable, and so on. Mismatch tolerance may be defined in a multitude of different ways. In some implementations, mismatch may be tolerated if no more than a certain number or a certain percentage of characters is mismatched or misplaced. In some implementations, different types of mismatches may enter with pre-determined weights. For example, a mismatch in a numeral or a letter may be counted with weight 1 while a mismatch in a punctuation mark (hyphen, comma, colon, etc.) may be counted with a lesser weight (e.g., 0.5 or some other value). The mismatch tolerance may be level-specific with larger tolerances accepted at the word level and lower levels of word shapes and smaller tolerances accepted at the higher levels of word shapes. In one non-limiting example, 20% error may be tolerated at the word level, 15% error may be tolerated at the intermediate word shape level-1, 10% error may be tolerated at the intermediate word shape level-2, and 5% error may be tolerated at the final word shape level. It should be understood that a practically unlimited number of other tolerance metrics may be used, which may be informed by a particular type of a document and a specific context in which the document was created (e.g., machine-generated documents may have lower tolerances than documents typed or handwritten by people), a type of the target entry, and so on. For example, search queries for credit card numbers or vehicle license plates may have zero error tolerances; street addresses may have higher error-tolerances than zip/postal codes, and so on.

The word shape mapping scheme depicted in FIG. 2B-2C is intended for illustration purposes only. An unlimited number of possible word shape mapping schemes may be implemented, with an arbitrary number of word shape levels. In some implementations, used in at least one of the word shape levels may be a byte-pair-encoding (BPE) that replaces the most common of pairs of symbols (e.g., ASCII bytes) with proxy characters, the process that can be repeated iteratively until no repeated pairs are left in a word or a combination of words.

Figure 3:
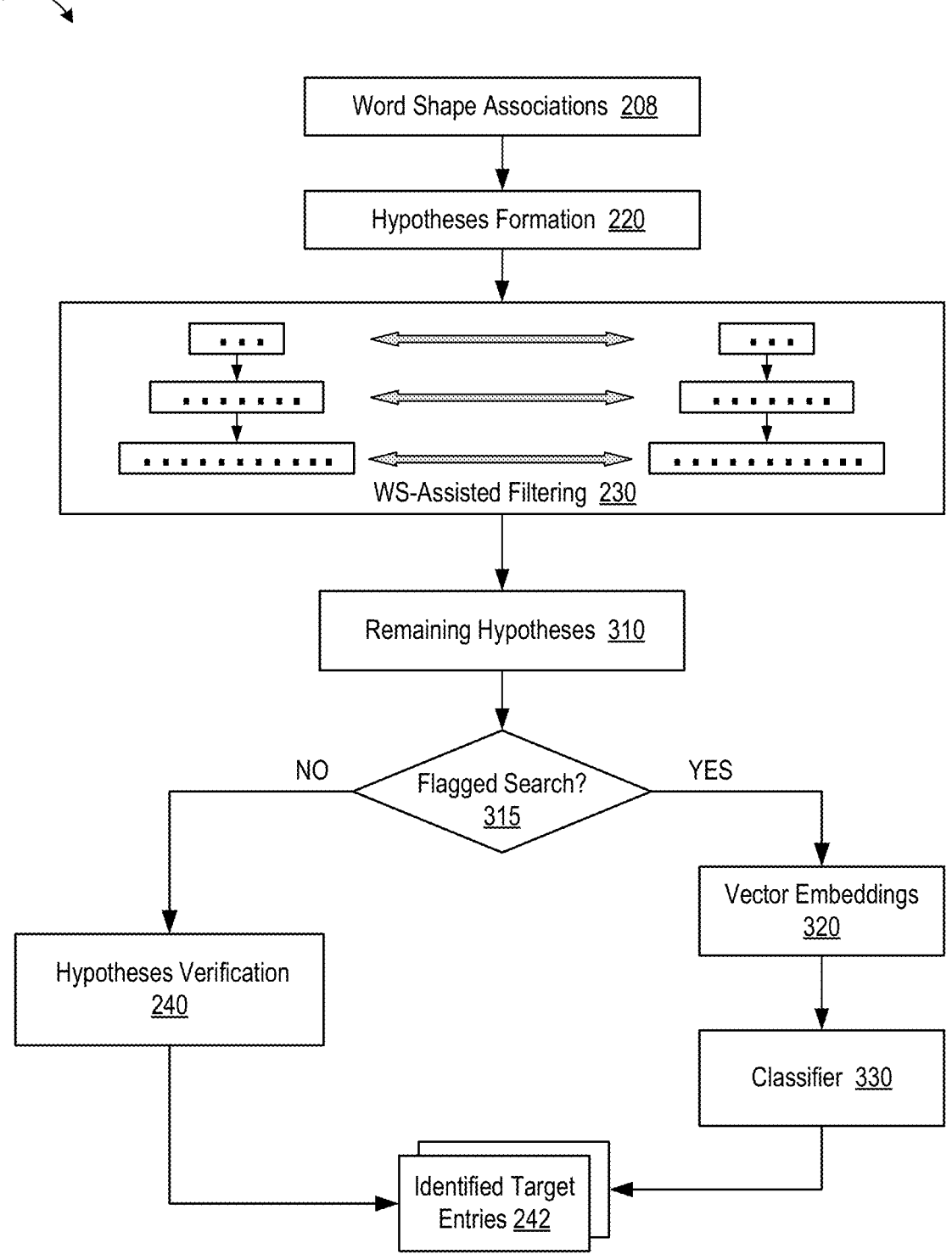
FIG. 3 is a schematic diagram illustrating example operations of a word shape-assisted search that deploys a trained classifier, in accordance with some implementations of the present disclosure.

FIG. 3 is a schematic diagram illustrating example operations 300 of a word shape-assisted search that deploys a trained classifier, in accordance with some implementations of the present disclosure. In some instances, exact matching of hypotheses-to-database entries (or matching within a pre-determined tolerance to error) may be impractical and may sometimes lead to null results. Problem may be encountered in executing queries related to documents that are handwritten, old, damaged, creased, documents that are prepared on a non-standard form, and so on.

In such instances, the user may flag a search as a likely "fuzzy" search in which a one or more hypotheses are to be processed by a classifier (e.g., classifier 118). As shown in FIG. 3, initial stages of the search may be performed similarly to the operations depicted in FIG. 2A. Specifically, performed may be word shape associations 208, hypotheses formation 220, and word shape-assisted filtering 230 of the formed hypotheses to obtain a set of remaining hypotheses 310. At a decision-making block 315, the QPS may determine if the search is flagged as a fuzzy search that is likely to yield null results. For example, the user may have flagged the search by setting a "fuzzy search" flag. If the QPS has determined the search to be a regular search, the QPS may proceed with hypotheses verification 240 and identifying target entries 242 substantially as described in conjunction with FIG. 2A. If, however, it is determined at the decision-making block 315 that the search is flagged, the QPS may process the remaining hypotheses 310 through a trained classifier.

The remaining hypotheses 310 may first be represented via a set of vector embeddings 320. In the embeddings representation, each word may be represented as a numerical string of a pre-determined length L (which may be visualized as a vector in an L-dimensional embeddings space). A vector embedding may be produced, for example, by a neural network implementing a mathematical transformation of symbols, such as alphanumerical characters, punctuation marks, etc., into their numeric representations.

The vector embeddings 320 may be generated using any suitable model or combination of models, such as Word2Vec, GloVe, FastText, etc. In some implementations, a recurrent neural network (RNN), a character-level RNN, a long short-term memory (LSTM) network, or any other similar network may be used, including any combination of such networks. The vector embeddings 320 may be generated in such a way that vector embeddings of two (or more) words that have close semantic meanings (e.g., "number" and "quantity") may have close numerical values (e.g., a small Euclidean distance in the L-dimensional space). Similarly, words that are likely to be found in close proximity to each other (e.g. "amount" and "tendered") may also be represented by vector embeddings that have close numerical values. The system (e.g., neural network) that generates vector embeddings 320 may have been previously trained using training inputs 154 and target outputs 156, as described above. The documents used in training phase—the training inputs 154 and target outputs 156—may be the documents of the same type that trigger the flagged search. The system trained to produce vector embeddings 320 may be capable of predicting what word is likely to follow or precede a given word. For example, the system trained to produce vector embeddings 320 may be able to predict that the word "amount" is preceded with the word "total" with 30% probability and is followed by the word "tendered" with 15% probability.

In some implementations, the vector embeddings 320 may be generated based on actual words in the remaining hypotheses 310. In other implementations, the vector embeddings may be generated based on a word shape representation of the actual words, which may be highest level word shapes or any intermediate level word shapes (e.g., intermediate level-1 word shapes). After each of the remaining hypotheses 310 is represented via a set of vector embeddings for the words of the respective hypothesis, the hypotheses may be processed by a classifier 330. For example, a hypothesis consisting of M words may be input into classifier 330 in the form of M vectors. Additionally, classifier 330 may receive vector embeddings of the remaining (after word shape-assisted filtering) database entries. In some implementations, classifier 330 may also receive word shapes of one or more levels for the remaining hypotheses (and the remaining database entries), a degree of mismatch (e.g., a number of misplaced or different symbols) between the respective word shapes of the words of the hypotheses and the words of the remaining database entries.

Classifier 330 may output one or more hypotheses (of the remaining hypotheses 310) that have the greatest probability of matching one or more database entries. For example, classifier 330 may generate, and the QPS may display to the user (e.g., on the user interface), a first hypothesis including 1) the words in the document selected as part of the first hypothesis, 2) the database entry determined by the classifier 330 as the most likely match, and 3) the probability (confidence level) that the displayed words of the document correspond to the displayed database entry. Similarly, a second, third, etc., hypotheses may also be displayed in the same format and, e.g., in the decreased order of confidence level. In some implementations, the user interface may optionally display (or make available to the user, in the form of a selectable link) a portion of the document with the words of the respective hypothesis highlighted, so that the user may assess the validity of the matching performed by the classifier 330. In some implementations, the classifier 330 may identify multiple sets of hypotheses. For example, classifier 330 may determine that the document contains multiple matches with different database entries, such as vendor's address, vendor's bank account information, vendor's business license and so on. Classifier 330 may then output a set of matches (e.g., in the decreasing order of likelihood) for each of the identified entries.

FIG. 4 is another schematic diagram illustrating example operations 400 of a word shape-assisted search that involves retraining the classifier, in accordance with some implementations of the present disclosure. In the implementation shown in FIG. 4, the QPS may first perform operations 200 of FIG. 2A in an attempt to find an exact match (or a match within a pre-determined error tolerance). If it is determined, at block 405, that such a match has been found, the QPS may identify target entries 242 and display the identified entries as described above. If it is determined, at block 405, that the search has not been successful, the QPS may deploy vector embeddings 320 and classifier 330, as described in conjunction with FIG. 3. At another decision-making block 415, the QPS may again reassess whether the search has been successful. For example, if the most probable hypothesis has a probability (confidence level) above a certain threshold probability (e.g., 80%, 90%) that a correct database entry has been identified (or, alternatively, determine with the same confidence level that no matching database entry exists), the QPS may conclude the search and display the results to the user (or lack thereof) together with identified target entries 242. If, however, the most probable hypothesis has the probability below the threshold probability (so that there is a substantial uncertainty whether the matching database entry exists), the QPS may deem the search unsuccessful and initiate retraining of the classifier. In some instances, the QPS may deem the search successful, but the user may review the output of the search and overrule this determination by initiating retraining of the classifier.

Responsive to initiation of the retraining, the document may be provided to the user (or any other operator) and the user may mark-up the document (block 420) by identifying the fields that are of interest to the user. Upon receiving the marked-up document, retraining engine 120 may perform classifier retraining 430 using the marked-up document as the new training input 154 and the user-identified fields (and the respective values of those fields) as the new target output 156. As depicted schematically with arrows, retraining may involve not only retraining classifier 330, but also include retraining the model that outputs vector embeddings 320. If it is determined during retraining that the user-identified fields (and their respective values) are not among the existing database entries, the respective values may be entered into the database. Consequently, by implementing operations 400, the QPS enables additional training of the system on the user's end with training documents that are of interest to the user.

Figure 6:
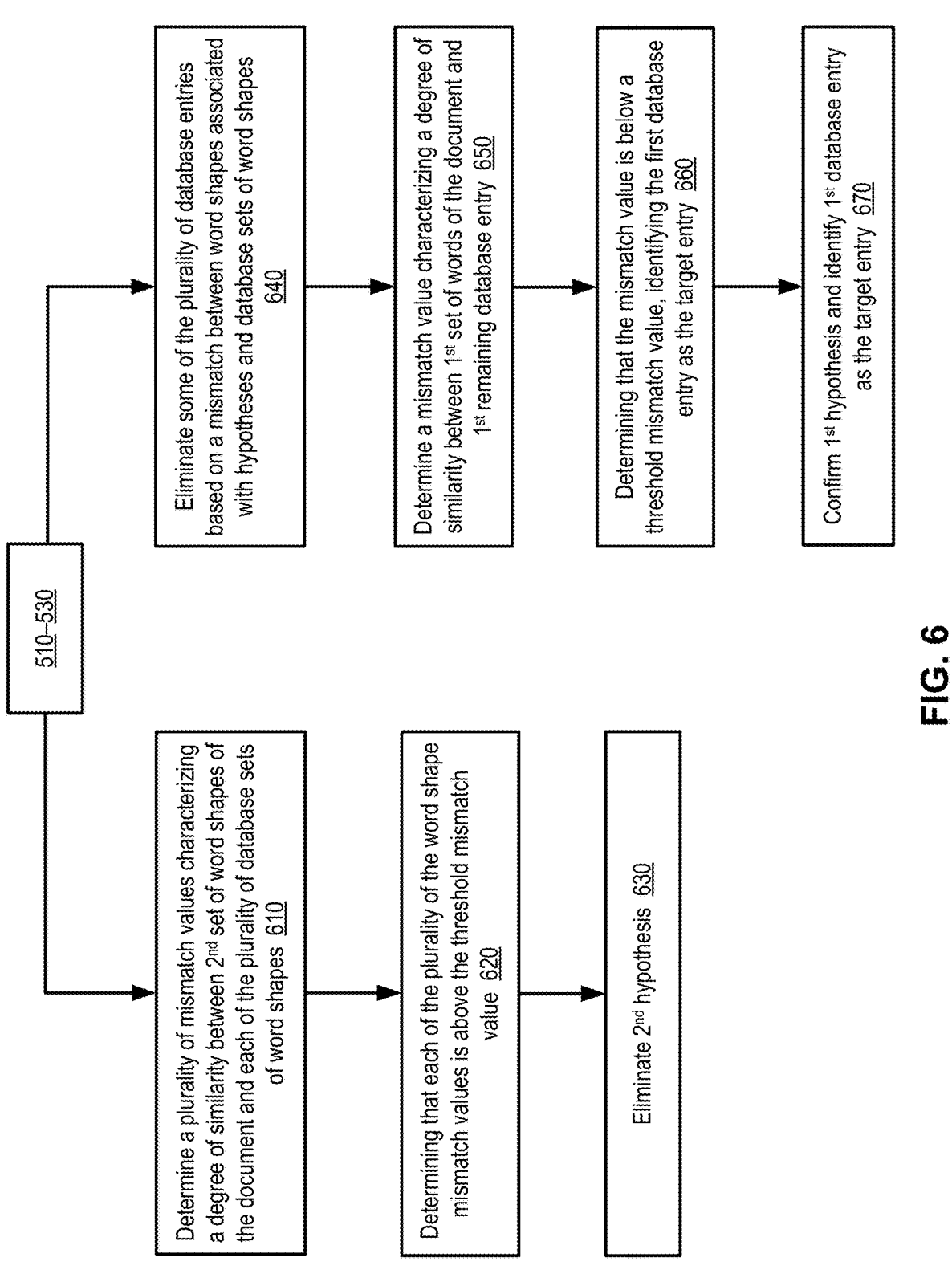
FIG. 6 is a flow diagram illustrating one example method of eliminating or confirming hypotheses that associate selected sets of words of a document with a target entry, in accordance with some implementations of the present disclosure.

FIGS. 5-7 are flow diagrams illustrating example methods 500-700 of performing word shape-assisted search queries, in accordance with some implementations of the present disclosure. Each of methods 500-700 may be performed by processing logic that may comprise hardware (e.g., circuitry, dedicated logic, programmable logic, microcode, etc.), software (such as instructions run on a processing device), firmware, or a combination thereof. In one implementation, methods 500-700 may be performed by a processing device (e.g. a processing device 802 of FIG. 8) of the query processing server 110 and/or training server 150 as described in connection with FIG. 1. In certain implementations, methods 500-700 may be performed by a single processing thread. Alternatively, methods 500-700 may be performed by two or more processing threads, each thread executing one or more individual functions, routines, subroutines, or operations of the method. In an illustrative example, the processing threads implementing methods 500-700 may be synchronized (e.g., using semaphores, critical sections, and/or other thread synchronization mechanisms). Alternatively, the processing threads implementing methods 500-700 may be executed asynchronously with respect to each other. Therefore, while FIGS. 5-7 and the associated descriptions list the operations of methods 500-700 in a certain order, various implementations of the methods may perform at least some of the described operations in parallel and/or in arbitrary selected orders. Methods 500-700 may be used to match information containing in an input document with information stored in a database, e.g., in the form of database entries. In various implementations, the document and the database may be located on a user's computer, on a query processing server, on cloud, or as any combination thereof. In some implementations, methods 500-700 may be performed automatically, without user's input and stored, locally or on cloud, for future access and use.

FIG. 5 is a flow diagram illustrating one example method 500 of identifying a target entry in a document using word shape-assisted searching, in accordance with some implementations of the present disclosure. The term "target entry" includes those database entries that are not known, at the start of the search query, to be present in the document and whose presence therein may itself be identified during execution of the search query. In some implementations, the type of the target entry may be known and the purpose of the search is to find all target entries of this type in the document. In some implementations, even the type of the target entry is not known beforehand, and the purpose of the search is to identify all database entities that may be present in the document. Although a single target entry is referenced in conjunction with FIG. 5 (and, similarly, FIGS. 6-7) for brevity and conciseness, it should be understood that more than one target entry (e.g., both an address and a banking information) may be identified in the same or a similar manner.

At block 510, a processing device performing method 500 may identify a mapping scheme in which words are represented via word shapes and a same word shape is capable of representing different words. As a result, a corpus of words (e.g., vocabulary of a document or a database) is represented via a smaller corpus of word shapes. Even though, by virtue of a multivalued character of word shape-to-word correspondence, a word shape phrase—a phrase in which each word is replaced with a word shape—may not carry the same amount of information as the original phrase, the word shape phrase has an advantage of being more amenable to an efficient search query processing since a corpus of words is generally larger (in some instances, substantially larger) than the associated with it corpus of word shapes.

In some implementations, the mapping scheme may include a single level of a word-to-word shape correspondence. In other implementations, the mapping scheme may include two or more intermediate word shape levels. For example, the mapping scheme may include a first intermediate word shape level (e.g., "intermediate word shape level-1" in FIGS. 2B-2C), which may be used to represent different words via a same first-level intermediate word shape. Similarly, the mapping scheme may further include additional intermediate word shape levels, such as a last intermediate word shape level (e.g., "intermediate word shape level-2" in FIGS. 2B-2C), which may be used to represent different last-level intermediate word shapes via the same word shape (e.g., of the "word shape level" in FIGS. 2B-2C). In some implementations, where only one intermediate word shape level is used, the first intermediate word shape level may be the same as the last intermediate word shape level. In various implementations, as many intermediate word shape levels may be used as practical and advantageous. Each of the intermediate word shape levels, e.g., the first intermediate word shape level, may map different letters to a same first alphanumerical character (e.g., "x" in FIGS. 2B-2C). and map different digits to a same second alphanumerical character (e.g., "0" in FIGS. 2B-2C).

At block 520, the processing device performing method 500 may identify (i) a database comprising a plurality of database entries and (ii) a plurality of database sets of word shapes, each of the database sets of word shapes representing one or more words of a respective database entry. For example, each word in a database entry may be replaced with word shapes to form a database set of word shapes for the entry. The term "database set of word shapes," as used herein, may refer to word shapes of any levels, including any of the intermediate word shape levels. In some implementations, each or at least some of database entries are stored together (or in association) with word shapes of each (or some) of the levels of the mapping scheme being used. In other implementations, at least some word shapes are not stored but generated in response to a search query being processed.

At block 530, method 500 may continue with the processing device forming a plurality of hypotheses prospectively associating various groups (sets) of words of the document with the target entry. The plurality of hypotheses may include a first/second/third/etc. hypothesis prospectively associating with the target entry (i) a first/second/third/etc. set of words of the document and (ii) a respective first/second/third/etc. set of word shapes. In some implementations, any of the first/second/third/etc. set of words of the document may have a predetermined number of words that depends on a type of the target entry. For example, in a search for the target entry of the driver's license type, each or some of the hypotheses may include one word (driver's license number) or two words (driver's license number and the state of issuance). In a search for the target entry of the address type, each or some of the hypotheses may include four or five words, and so on.

Throughout this description, the terms "first," "second," "third," etc., should be understood as mere identifiers and not to be taken as indications of an order in which a particular hypothesis is formed or verified.

At block 540, the processing device performing method 500 may eliminate the second hypothesis based on a mismatch between the second set of word shapes and each of the plurality of the database sets of word shapes, e.g., upon determination that each such mismatch exceeds a threshold value. Such a determination may indicate that the words of the second hypothesis are sufficiently different from the words of each of the database entries. Whereas the second hypotheses may be eliminated based on a mismatch at the final word shape level, any number of hypotheses may additionally be eliminated based on a mismatch at one of the intermediate word shape levels. For example, a third hypothesis may be eliminated based on a mismatch between (i) a set of first-level intermediate word shapes that represent the third set of words of the document (the words selected as the third hypothesis) and (ii) each of a plurality of first-level intermediate sets of database word shapes that represent a corresponding database entry. More specifically, eliminating the third hypothesis may be performed responsive to determining that the mismatch between the set of first-level intermediate word shapes (that represent the third set of words) and each of the plurality of first-level intermediate sets of database word shapes exceeds a threshold value. Accordingly, the second hypothesis and the third hypothesis may be eliminated based on a mismatch of word shapes (rather than words), which may be a much faster procedure than eliminating hypotheses using the actual words.

At block 550, method 500 may continue with the processing device identifying the first set of words of the document as the target entry by confirming the first hypothesis. More specifically, confirming the first hypothesis may be performed as described below in relation to methods 600 and 700.

FIG. 6 is a flow diagram illustrating one example method 600 of eliminating or confirming hypotheses that associate selected sets of words of a document with a target entry, in accordance with some implementations of the present disclosure. In some implementations, method 600 may be performed in conjunction with method 500. For example, after performing blocks 510-530 of method 500, a processing device performing method 500 may eliminate a particular hypothesis, herein referred to as the second hypothesis, by executing operations of blocks 610-630, which may be performed as part of block 540 of method 500.

For example, at block 610, the processing device performing method 600 may identify a second set of word shapes representing words of the second hypothesis and may determine a plurality of (word shape) mismatch values for the second hypothesis, each of the mismatch values characterizing a degree of similarity between (i) the second set of word shapes of the document and (ii) each of the plurality of database sets of word shapes. At block 620, the processing device may determine that each of the plurality of the mismatch values is at or above the threshold mismatch value and, at block 630 eliminate the second hypothesis. The mismatch values used in eliminating the second hypothesis may reflect how many symbols are positioned differently in any two word shapes or sets of word shapes being compared, how many symbols are missing, how many symbols are extra, and so on. In some implementations, a different order of words/word shapes may be counted towards a mismatch value while in other implementations (e.g., depending on type of document and/or target entry) the order of words/word shapes is not counted as a mismatch. In some implementations, a different order is counted as a partial mismatch. A different order of words/word shapes between a set A and a set B may be quantified as a minimum number of permutations used to change words/word shapes of set A to have an order of words/word shapes of set B.

In addition to eliminating one or more hypotheses based on mismatch of word shapes, method 600 may include confirming at least one hypothesis, referred herein to as the first hypothesis. Specifically, after performing blocks 510-530 of method 500, the processing device performing method 500 may, at block 640, obtain a reduced plurality of database entries by eliminating one or more of the plurality of database entries based on a (word shape) mismatch between each of sets of word shapes associated with a respective hypothesis of the plurality of hypotheses and a database set of word shapes of each of the one or more database entries being eliminated. Whereas in blocks 610-630 eliminated are those hypotheses that do not match (up to the threshold mismatch value) any of the database entries, in block 640 eliminated are those databases entries that do not match any of the hypotheses. The first hypothesis may be among those hypotheses that are not eliminated by operations of blocks 610-630.

At block 650, the processing device performing method 600 may determine a (word) mismatch value characterizing a degree of similarity between (i) the first set of words of the document and (ii) a first database entry of the reduced plurality of database entries. At block 660, method 600 may continue with the processing device determining that the mismatch value (for the first hypothesis) is below a threshold (word) mismatch value and confirming, at block 670, the first hypothesis by identifying the first database entry as the target entry. Whereas word shape mismatch values may be used in operations of blocks 610-620 and 640, word mismatch value may be used in operations of block 650 that may be computed and evaluated differently than the word shape mismatch values.

In some implementations, the word threshold mismatch value $M_W$ for confirming the first hypothesis may be smaller than the word shape threshold mismatch value $M_T$ used for eliminating hypotheses: $M_W < M_T$, meaning that while a relatively large word shape threshold mismatch $M_T$ for elimination of hypotheses may be expected, a lower word threshold mismatch value $M_W$ may be expected for confirmation of hypotheses. In some implementations, the word threshold mismatch value $M_W$ may be fixed, being the same across multiple documents. In some implementations, the word threshold mismatch value $M_W$ may be dynamic, e.g., document-specific. For example, the word threshold mismatch value $M_W$ may be equal to the second lowest mismatch value for the document, meaning that the hypothesis with the lowest mismatch (the highest similarity) is selected.

FIG. 7 is a flow diagram illustrating one example method 700 that deploys a trained classifier in word shape-assisted searches of documents, in accordance with some implementations of the present disclosure. In some implementations, method 700 may be performed in conjunction with method 500. For example, after performing blocks 510-540 of method 500, to confirm the first hypothesis, a processing device performing method 700 may, at block 710, determine that each of a sub-plurality of the plurality of hypotheses is characterized by a sub-threshold mismatch value ($M < M_T$) between one or more word shapes associated with a respective hypothesis and at least one of the plurality of the database sets of word shapes. In some implementations, the sub-plurality of hypotheses may include all hypotheses that are not eliminated by the operations of blocks 610-630. The sub-plurality of hypotheses may include the first hypothesis.

At block 720, the processing device performing method 700 may obtain word embeddings for the one or more words of each of the sub-plurality of hypotheses. At block 730, the processing device may process the obtained word embeddings with a trained classifier to confirm the first hypothesis and identify the first set of words of the document as the target entry. In some implementations, the trained classifier is trained using a plurality of training documents, each of the plurality of training documents having indications of one or more training entries (e.g., marked-up fields in the training documents).

Figure 8:
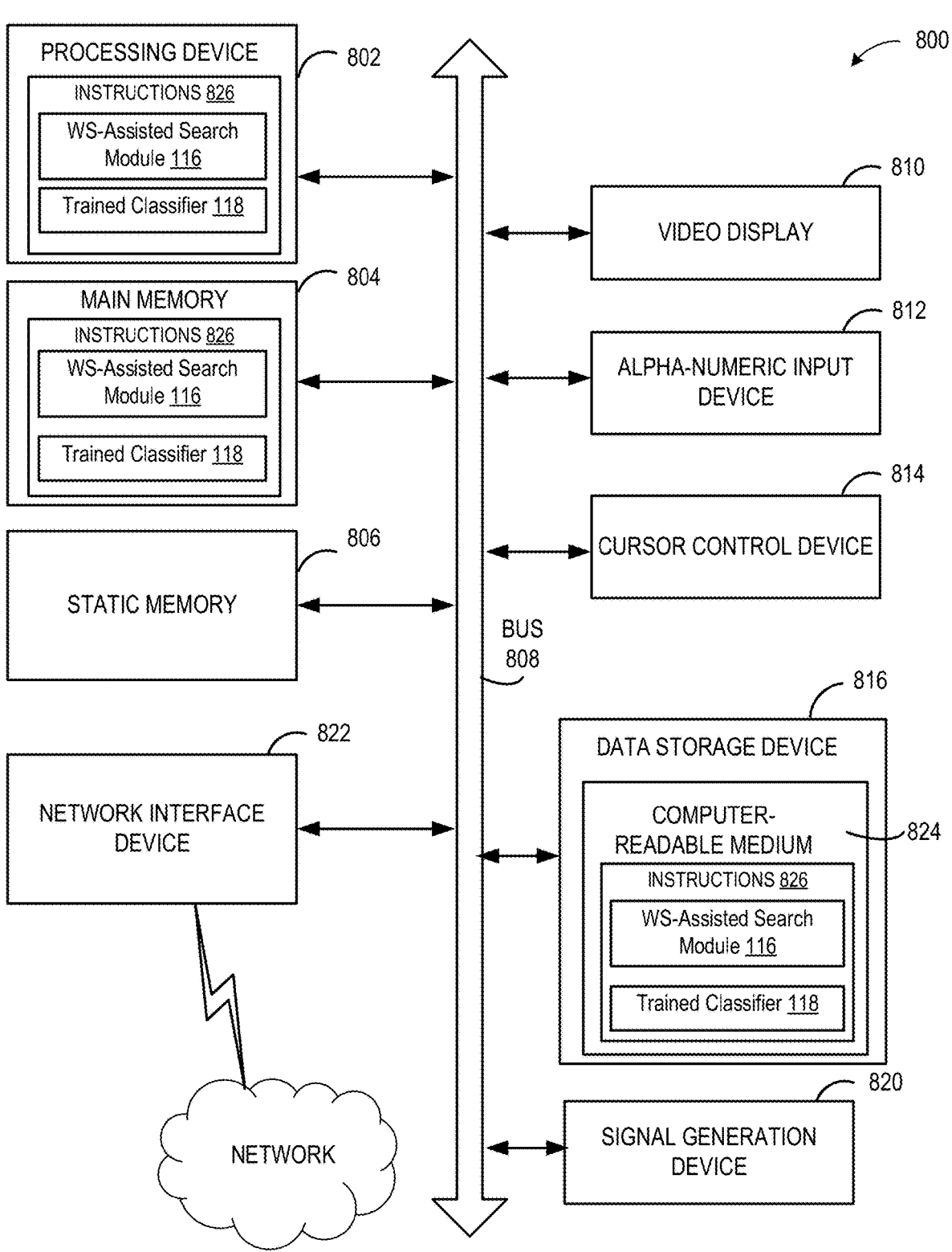
FIG. 8 illustrates a block diagram of a computer system in accordance with some implementations of the present disclosure.

FIG. 8 depicts an example computer system 800 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for implementing word shape-assisted search module 116, trained classifier 118, and/or other components and modules depicted in FIG. 1, used to perform the operations and methods discussed herein, including but not limited to method 500 of identifying a target entry in a document using word shape-assisted searching, method 600 of eliminating or confirming hypotheses that associate selected sets of words of a document with a target entry, and method 700 that deploys a trained classifier in word shape-assisted searches of documents.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable storage medium 824 on which is stored the instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable media. In some implementations, the instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method to identify a target entry in a document, the method comprising:
identifying:
a database comprising a plurality of database entries; and
a plurality of database sets of word shapes, each of the database sets of word shapes representing one or more words of a respective database entry according to a mapping scheme that comprises:
a single-valued mapping of words to word shapes, and
a multi-valued inverse mapping of word shapes to words;
forming, using the mapping scheme, a plurality of hypotheses comprising:
a first hypothesis prospectively associating with the target entry (i) a first set of one or more words of the document and (ii) a respective first set of word shapes; and
a second hypothesis prospectively associating with the target entry (i) a second set of one or more words of the document and (ii) a respective second set of word shapes;
eliminating the second hypothesis based on a mismatch between the second set of word shapes and each of the plurality of the database sets of word shapes; and
identifying the first set of words of the document as the target entry by confirming the first hypothesis.

2. The method of claim 1, wherein the mapping scheme comprises one or more intermediate word shape levels, and wherein:

a first intermediate word shape level of the one or more intermediate word shape levels represents different words via a same first-level intermediate word shape, and
a last intermediate word shape level of the one or more intermediate word shape levels represents different last-level intermediate word shapes via a single word shape.

3. The method of claim 2, wherein the first intermediate word shape level maps:
different letters to a same first alphanumerical character, and
different digits to a same second alphanumerical character.

4. The method of claim 2, wherein the plurality of hypotheses further comprises a third hypothesis prospectively associating a third set of words of the document with the target entry, and wherein the method further comprises:
eliminating the third hypothesis based on a mismatch between (i) a set of first-level intermediate word shapes that represent the third set of words of the document and (ii) each of a plurality of first-level intermediate sets of database word shapes that represent a corresponding database entry.

5. The method of claim 4, wherein eliminating the third hypothesis is responsive to determining that the mismatch between the set of first-level intermediate word shapes and each of the plurality of first-level intermediate sets of database word shapes exceeds a threshold value.

6. The method of claim 1, wherein confirming the first hypothesis comprises:
obtaining a reduced plurality of database entries by eliminating one or more of the plurality of database entries based on a mismatch between each of sets of word shapes associated with a respective hypothesis of the plurality of hypotheses and a database set of word shapes of each of the one or more database entries being eliminated;
determining a mismatch value characterizing a degree of similarity between (i) the first set of words of the document and (ii) a first database entry of the reduced plurality of database entries; and
responsive to determining that the mismatch value is below a threshold mismatch value, identifying the first database entry as the target entry.

7. The method of claim 1, wherein eliminating the second hypothesis comprises:
determining a plurality of mismatch values, each of the mismatch values characterizing a degree of similarity between (i) the second set of word shapes of the document and (ii) each of the plurality of database sets of word shapes; and
determining that each of the plurality of the mismatch values is above a threshold mismatch value.

8. The method of claim 1, wherein the first set of words of the document and the second set of words of the document have a predetermined number of words that depends on a type of the target entry.

9. The method of claim 1, wherein confirming the first hypothesis comprises:
determining that each of a sub-plurality of the plurality of hypotheses is characterized by a sub-threshold mismatch value between one or more word shapes associated with a respective hypothesis and at least one of the plurality of the database sets of word shapes, wherein the sub-plurality of hypotheses comprises the first hypothesis;

obtaining word embeddings for the one or more words of each of the sub-plurality of hypotheses; and processing the obtained word embeddings with a trained classifier to identify the first set of words of the document as the target entry.

10. The method of claim 9, wherein the trained classifier is trained using a plurality of training documents, each of the plurality of training documents comprising indications of one or more training entries.

11. The method of claim 1, wherein at least some of the plurality of hypotheses are formed based, at least in part, on word shapes of words selected for a respective hypothesis.

12. A non-transitory machine-readable storage medium including instructions that, when accessed by a processing device, cause the processing device to:

identify:

a database comprising a plurality of database entries; and a plurality of database sets of word shapes, each of the database sets of word shapes representing one or more words of a respective database entry according to a mapping scheme that comprises:

a single-valued mapping of words to word shapes, and a multi-valued inverse mapping of word shapes to words;

form, using the mapping scheme, a plurality of hypotheses comprising:

a first hypothesis prospectively associating with a target entry in a document (i) a first set of one or more words of the document and (ii) a respective first set of word shapes; and a second hypothesis prospectively associating with the target entry (i) a second set of one or more words of the document and (ii) a respective second set of word shapes;

eliminate the second hypothesis based on a mismatch between the second set of word shapes and each of the plurality of the database sets of word shapes; and identify the first set of words of the document as the target entry by confirming the first hypothesis.

13. The non-transitory machine-readable storage medium of claim 12, wherein the mapping scheme comprises one or more intermediate word shape levels, and wherein:

a first intermediate word shape level of the one or more intermediate word shape levels represents different words via a same first-level intermediate word shape, and a last intermediate word shape level of the one or more intermediate word shape levels represents different last-level intermediate word shapes via a single word shape.

14. The non-transitory machine-readable storage medium of claim 13, wherein the first intermediate word shape level maps:

different letters to a same first alphanumerical character, and different digits to a same second alphanumerical character.

15. The non-transitory machine-readable storage medium of claim 13, wherein the plurality of hypotheses further comprises a third hypothesis prospectively associating a third set of words of the document with the target entry, and wherein instructions are further to cause the processing device to:

eliminate the third hypothesis based on a mismatch between (i) a set of first-level intermediate word shapes that represent the third set of words of the document and (ii) each of a plurality of first-level intermediate sets of database word shapes that represent a corresponding database entry.

16. The non-transitory machine-readable storage medium of claim 12, wherein to confirm the first hypothesis the processing device is to:

obtain a reduced plurality of database entries by eliminating one or more of the plurality of database entries based on a mismatch between each of sets of word shapes associated with a respective hypothesis of the plurality of hypotheses and a database set of word shapes of each of the one or more database entries being eliminated;

determine a mismatch value characterizing a degree of similarity between (i) the first set of words of the document and (ii) a first database entry of the reduced plurality of database entries; and responsive to determining that the mismatch value is below a threshold mismatch value, identify the first database entry as the target entry.

17. The non-transitory machine-readable storage medium of claim 12, wherein to eliminate the second hypothesis the processing device is to:

determine a plurality of mismatch values, each of the mismatch values characterizing a degree of similarity between (i) the second set of word shapes of the document and (ii) each of the plurality of database sets of word shapes; and determine that each of the plurality of the mismatch values is above a threshold mismatch value.

18. The non-transitory machine-readable storage medium of claim 12, wherein the first set of words of the document and the second set of words of the document have a predetermined number of words that depends on a type of the target entry.

19. The non-transitory machine-readable storage medium of claim 12, wherein to confirm the first hypothesis the processing device is to:

determine that each of a sub-plurality of the plurality of hypotheses is characterized by a sub-threshold mismatch value between one or more word shapes associated with a respective hypothesis and at least one of the plurality of the database sets of word shapes, wherein the sub-plurality of hypotheses comprises the first hypothesis;

obtain word embeddings for the one or more words of each of the sub-plurality of hypotheses; and process the obtained word embeddings with a trained classifier to identify the first set of words of the document as the target entry.

20. A system comprising:

a memory; and a processing device operatively coupled to the memory, the processing device to:

identify:

a database comprising a plurality of database entries; and a plurality of database sets of word shapes, each of the database sets of word shapes representing one or more words of a respective database entry according to a mapping scheme that comprises:

a single-valued mapping of words to word shapes, and a multi-valued inverse mapping of word shapes to words;

form, using the mapping scheme, a plurality of hypoth-
eses comprising:

a first hypothesis prospectively associating with a
target entry in a document (i) a first set of one or
more words of the document and (ii) a respective 5
first set of word shapes; and a second hypothesis prospectively associating with
the target entry (i) a second set of one or more
words of the document and (ii) a respective second
set of word shapes; 10 eliminate the second hypothesis based on a mismatch
between the second set of word shapes and each of
the plurality of the database sets of word shapes; and identify the first set of words of the document as the
target entry by confirming the first hypothesis. 15

\* \* \* \* \*